United States Patent [19]
Higashikata et al.

[11] Patent Number: 5,615,071
[45] Date of Patent: Mar. 25, 1997

[54] THERMAL PROTECTOR FOR HERMETIC ELECTRICALLY-DRIVEN COMPRESSORS

[75] Inventors: Isao Higashikata, Owariasahi; Yasunori Ando, Aichi-ken; Hideki Koseki, Koyamanishi, all of Japan

[73] Assignee: Ubukata Industries Co., Ltd., Nagoya, Japan

[21] Appl. No.: 562,059

[22] Filed: Nov. 22, 1995

[30] Foreign Application Priority Data

| Dec. 2, 1994 | [JP] | Japan | 6-329468 |
| Apr. 17, 1995 | [JP] | Japan | 7-116379 |
| May 15, 1995 | [JP] | Japan | 7-141073 |
| Sep. 13, 1995 | [JP] | Japan | 7-262340 |

[51] Int. Cl.$^6$ .................................................. H02H 7/00
[52] U.S. Cl. ............................ 361/22; 361/25; 361/103
[58] Field of Search ............................ 361/22, 24–26, 361/32, 103, 105, 106; 439/621, 622; 310/68 C, 71; 337/34, 112, 226, 227, 372, 380, 388, 418

[56] References Cited

U.S. PATENT DOCUMENTS

| 4,748,531 | 5/1988 | Ortiz | 361/24 |
| 4,791,329 | 12/1988 | Ubukata et al. | 310/68 C |
| 5,015,985 | 5/1991 | Ubukata et al. | 337/368 |
| 5,196,820 | 3/1993 | Ubukata et al. | 337/368 |

FOREIGN PATENT DOCUMENTS

| 2-227928 | 9/1990 | Japan | H01H 37/54 |
| 3-156183 | 7/1991 | Japan | F04B 49/10 |
| 5-036335 | 2/1993 | Japan | H01H 37/54 |
| 5-027291 | 4/1993 | Japan | F04B 39/00 |

*Primary Examiner*—Howard L. Williams
*Assistant Examiner*—Ronald W. Leja
*Attorney, Agent, or Firm*—Foley & Lardner

[57] ABSTRACT

A thermal protector for a hermetic electrically-driven compressor includes a thermal switch and a cluster socket. The protector is mounted inside a compressor housing on a terminal assembly mounted in a wall of the compressor housing. A casing of the thermal switch and a header plate hermetically closing an open end of the casing integrally form a flange on the peripheral edges when the header plate is secured to the casing. The thermal switch has two terminals one of which is provided with a receptacle into which one of terminal pins of the terminal assembly is fitted, and the other terminal is connected to a common lead wire of a compressor motor. The cluster socket has a plurality of terminal cavities for connecting windings of the motor to the terminal assembly. A body of the socket has a face having a pair of holding portions for holding the flange. Each holding portion has a hook-shaped portion at an end. The casing and the socket are integrally connected together such that a large part of the casing is exposed outside the socket body, when the flange is held by the holding portions and the receptacle is inserted to a position where it is opposed to the one terminal pin of the terminal assembly.

6 Claims, 17 Drawing Sheets

THERMAL PROTECTOR FOR HERMETIC ELECTRICALLY-DRIVEN COMPRESSORS

BACKGROUND OF THE INVENTION

1. Field of the Invention

This invention relates to a thermal protector mounted in a hermetic housing of a hermetic electrically-driven compressor for cutting off an electric path in response to a temperature of a refrigerant in the housing upon occurrence of an overcurrent and/or an overheat, thereby protecting an electric motor of the compressor, and more particularly to such a thermal protector which is directly mounted to a terminal assembly air-tightly mounted in a wall of the compressor housing so that the protector serves as a connector connecting between the terminal assembly and an electric motor of the compressor.

2. Description of the Prior Art

The prior art has provided various types of thermal protectors for hermetic electrically-driven compressors. These types are classified mainly depending upon manners of mounting a thermal switch with an airtight structure in a compressor housing. In one type, a terminal assembly is airtightly mounted in a wall of the compressor housing, and the thermal switch is mounted to the terminal assembly inside the compressor housing. Since the thermal switch can be easily mounted, this type has been recommended. Publication No. 5-27291 of a Japanese unexamined utility model registration application discloses this type of thermal protector. In the disclosed protector, one of terminals of the thermal switch is connected to one of lead wires of the compressor motor. A terminal strip having a receptacle at its one end is secured to the other terminal of the thermal switch. The terminal strip is inserted into a cluster socket to be fixed on an inner side wall thereof. The cluster socket and the terminal assembly are interfitted together.

The thermal switch can be easily mounted in the above-described publication. However, the thermal switch is fixed via the single terminal strip to the cluster socket. Accordingly, a force from the lead wires of the motor acts on the thermally responsive switch so as to depart the same from the cluster socket when the socket is mounted to the terminal assembly. Consequently, both terminals of the thermal switch and the terminal strip may be deformed and damaged. Furthermore, when a large thermal switch is used for a large scale compressor, mechanical vibration caused by the compressor in operation is transmitted to the thermal switch, resulting in damage of the terminals of the switch.

Publication No. 3-156183 of a Japanese unexamined patent application discloses a thermal protector in which the thermal switch is mounted to the cluster socket and thereafter, the assembly of the thermal switch and the socket is covered up by a heat-shrinkable insulating tube. In this protector, a compulsive force is not applied to the terminals of the thermal switch even when the terminals are drawn toward the lead wires of the motor. However, the insulating tube needs to be heat-shrunken in the condition that the motor is connected to the thermal switch. In this condition, heating the tube has difficulty. Furthermore, the insulating tube has apertures through which the terminals of the terminal assembly are fitted in apertures of the cluster socket. The positioning of these apertures is required when the assembly of the thermal switch and the cluster socket is covered by the insulating tube. Additionally, since the thermal switch is covered by the insulating tube, the surface of the thermal switch is not brought into direct contact with the refrigerant, which reduces the thermal responsiveness of the thermal switch.

SUMMARY OF THE INVENTION

Therefore, an object of the present invention is to provide a thermal protector for the hermetic electrically-driven compressors wherein the problems described above in conjunction with the prior art can be solved.

The present invention provides a thermal protector for a hermetic electrically-driven compressor which includes an electric motor and a hermetic housing having a wall in which a hermetic terminal assembly having a plurality of terminal pins is mounted. The protector is mounted inside the compressor housing so as to be opposed to the terminal assembly. The protector comprises a thermal switch comprising a metal casing having a generally dome-shaped section and an open end, a thermal switch mechanism accommodated in the casing, a header plate hermetically closing the open end of the casing and having a portion parallel to the metal casing in the longitudinal direction thereof, the casing and the header plate integrally forming a flange on the peripheral edges thereof when the header plate is secured to the casing to hermetically close the open end of the casing, and two terminals one of which is provided with a receptacle into which one of the terminal pins of the terminal assembly is fitted, the other terminal being connected to a common lead wire of the motor. The protector further comprises a cluster socket having a plurality of terminal cavities provided for connecting windings of the motor to the terminal assembly, the socket including a body which has a face further having a pair of holding portions for holding the flange, the holding portions having at one ends hook-shaped portions respectively, the socket further having a common terminal cavity parallel to the holding portions. The casing and the socket are integrally connected together such that a larger part of the casing is exposed outside the socket body, when the flange is held by the holding portions and the receptacle is inserted to a position where the same is opposed to said one terminal pin of the terminal assembly.

In the above-described thermal protector, the terminal arm is slid toward the innermost of the common terminal cavity of the cluster socket in the connection of the thermal switch to the socket. On this occasion, the flange of the thermal switch is simultaneously held by the holding portions with a large part of the casing of the thermal switch being exposed outside the socket, whereupon the connection of the socket and the thermal switch is completed.

According to the present invention, no additional parts are required for connecting the thermal switch to the cluster socket. Thus, the thermal switch can be easily connected to the cluster socket and the thermal protector has a simple construction. Furthermore, the larger part of the casing of the thermal switch is exposed outside the socket when the thermal switch is connected to the socket. Consequently, since the thermal switch is sufficiently exposed to the flow of refrigerant inside the compressor housing, a high level of thermal responsiveness can be achieved.

The thermal switch of the protector is held on the cluster socket by the holding portions. Consequently, the terminals of the thermal switch can be prevented from being deformed or damaged even if a force caused at the motor lead wire side acts so as to separate the thermal switch from the cluster socket during the connection of the thermal switch to the cluster socket.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
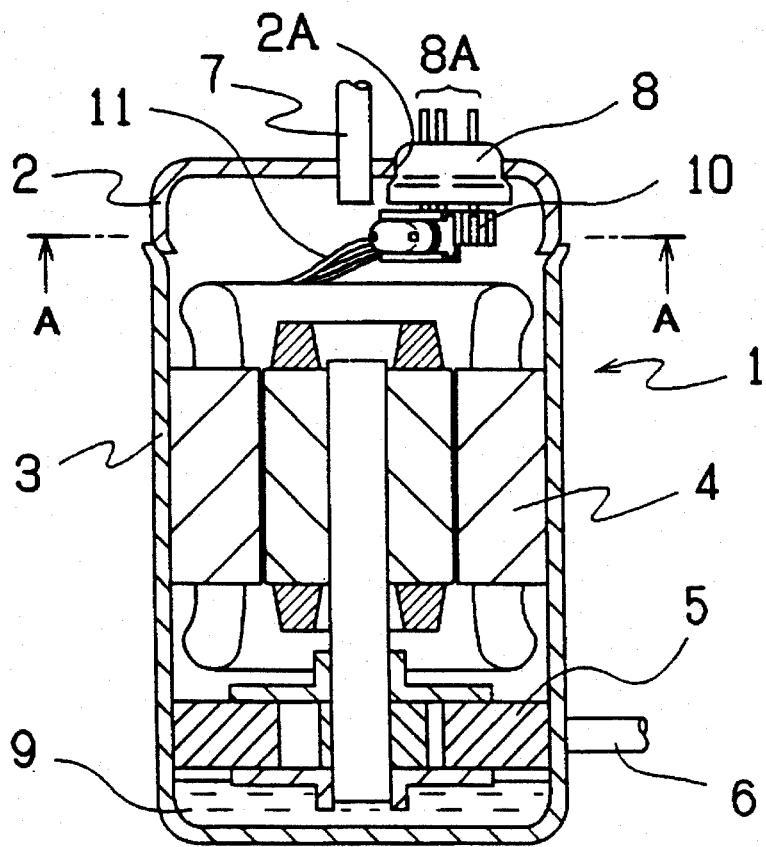
FIG. 1 is a longitudinal section of a hermetic electrically-driven compressor in which a thermal protector of a first embodiment in accordance with the present invention is provided.
Figure 2:
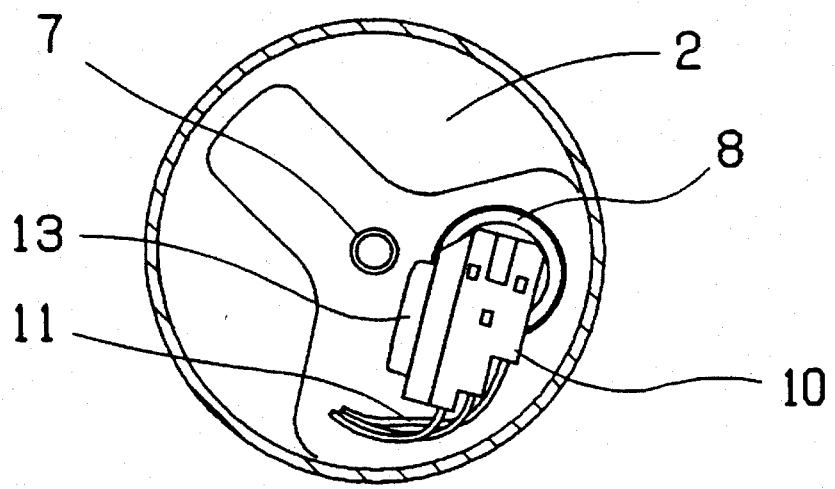
FIG. 2 is a section taken along line A—A in FIG. 1.

A first embodiment of the present invention will be described with reference to FIGS. 1 to 7. Referring to FIGS. 1 and 2, a hermetic electrically-driven compressor 1 of the high-pressure housing type is shown. The compressor 1 comprises a cap 2 and a lower container 3 both of which constitute a hermetic housing. A known electric motor 4 and a known compressing means 5 are enclosed and fixed in the compressor housing. A suction pipe 6 is connected through the lower circumferential wall of the compressor housing to the compressing means 5 for introducing refrigerant delivered from a heat exchanger (not shown) to the compressing means 5. The refrigerant compressed by the compressing means 5 is discharged from the compressing means 5 to the upper interior of the compressor housing through the motor 4. The refrigerant is then resupplied through a discharge pipe 7 to the heat exchanger. The cap 2 has a hole 2A in which a terminal assembly 8 is airtightly fixed by way of welding or the like. The terminal assembly 8 includes a plurality of terminal pins 8A extending through apertures formed in the top and the backside thereof with an insulating material such as glass being provided between the terminal pins 8A and the apertures. Consequently, the terminal assembly 8 serves as a connecting member providing electrical connection between an external power source and the motor 4 in the compressor housing. A lubricating oil 9 is reserved on the bottom of the compressor housing for the motor 4 and the compressor 5.

A thermal protector 10 is mounted to a portion of the terminal assembly 8 located inside the compressor housing with the terminal pins 8A being inserted in apertures of the protector as will be described later, whereupon the terminal pins 8A are electrically connected to lead wires 11 of the motor 4 respectively.

Referring now to FIGS. 3 to 7, the thermal protector will now be described. The thermal protector 10 comprises a thermal switch 13 and a cluster socket 12 holding the thermal switch 13. The cluster socket 12 is formed of an insulating material such as a synthetic resin into the shape of a slightly flat box. The cluster socket 12 has a pair of holding portions 12G formed in one side thereof for holding the thermal switch 13, whereby the collector socket 12 is coupled to the thermal switch 13, as shown in FIGS. 4A and 4B. The thermal switch 13 is of an internal protector type and comprises an airtight metal casing and a switching mechanism including a thermally responsive element such as a bimetal and enclosed in the metal casing as well known in the art. For example, publication Nos. 2-227928 and 5-36335 of Japanese unexamined patent applications each disclose the construction of such a thermal switch. In the thermal switch, the temperature of gas with which the outer surface of the metal casing thereof is brought into contact is transmitted to the internal thermally responsive element so that an electric path to the motor 4 is cut off upon occurrence of the overheat of the motor and/or the overcurrent condition.

Figure 4A:
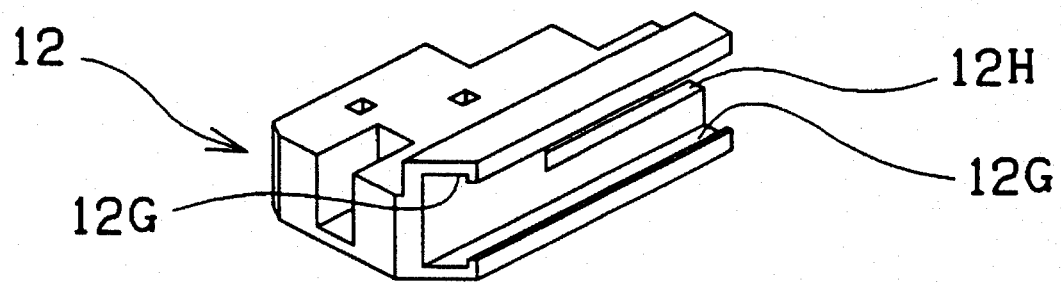
FIGS. 4A and 4B are perspective views of a cluster socket, showing the backside and the top respectively.
Figure 4B:
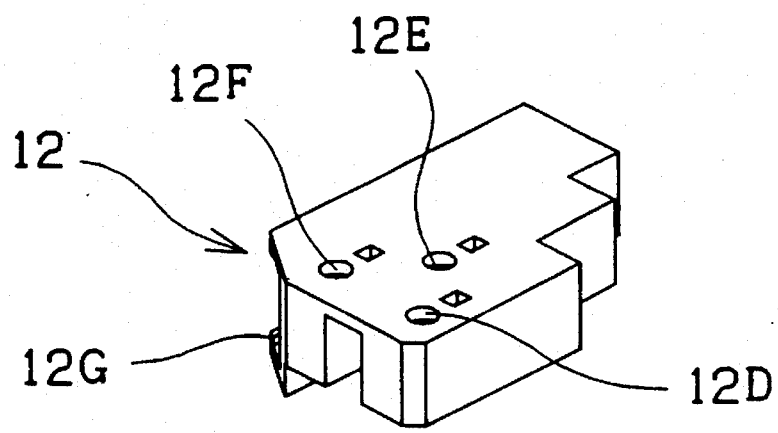
Figure 5:
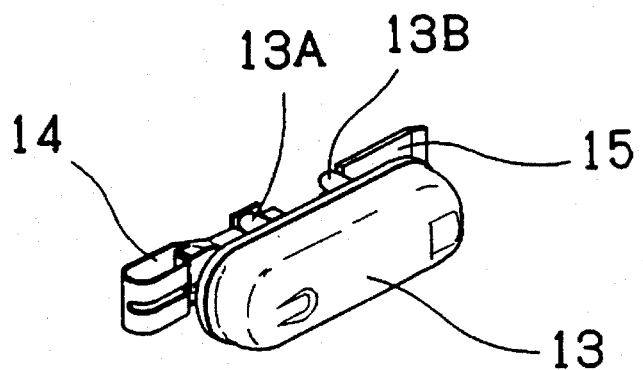
FIG. 5 is a perspective view of a thermal switch composing the thermal protector.
Figure 6:
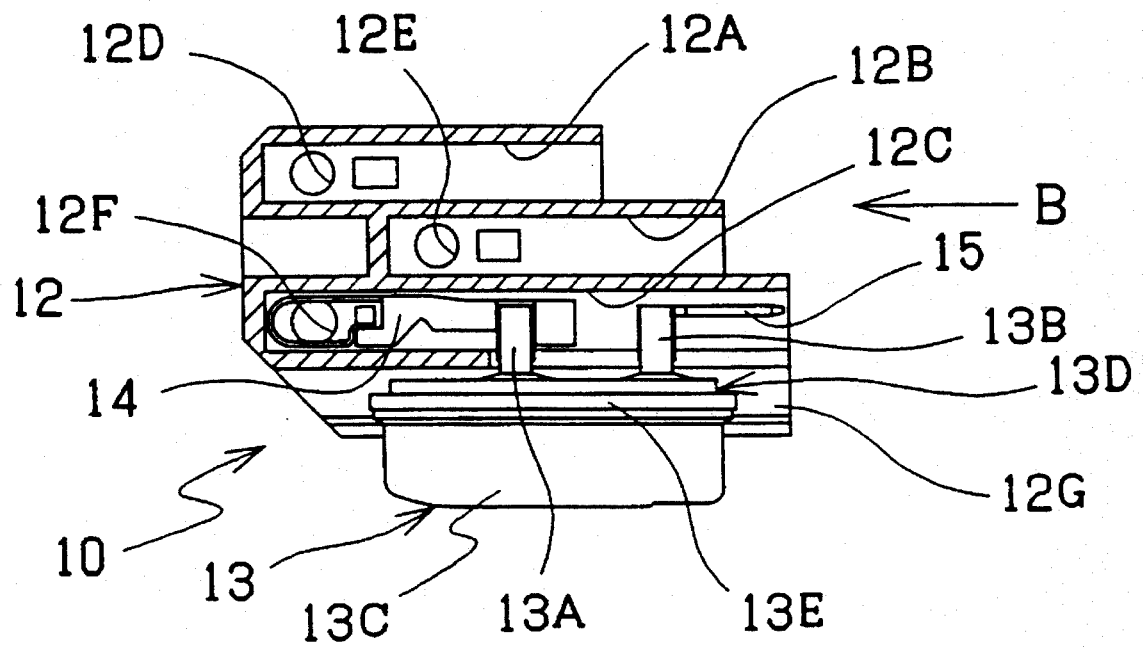
FIG. 6 is a transverse cross section of the thermal protector.

The cluster socket 12 has a plurality of socket apertures 12D, 12E and 12F formed in the upper face thereof, for example, as shown in FIG. 4B. These socket apertures receive the terminal pins 8A respectively. The depths of the socket apertures 12D, 12E and 12F are set so that the socket apertures are open to a plurality of terminal cavities 12A, 12B and 12C at a right angle respectively, as shown in FIG. 6. The terminal cavities 12A, 12B and 12C are formed in the cluster socket so as to extend from one side thereof in the same direction. Terminal strips (not shown) secured to one ends of the lead wires extending from a primary winding and an auxiliary winding of the motor 4 are inserted into the terminal cavities so that the terminal strips are connected to the corresponding terminal pins 8A, respectively. The terminal strips are held in position when inserted into the respective terminal cavities, as well known in the art. Various known manners of holding the terminal strips in the respective terminal cavities may be employed, and the structure therefor is not described nor shown. The cluster socket 12 has square apertures formed in the vicinity of the respective socket apertures 12D, 12E and 12F. A common terminal cavity 12C receives a terminal arm 14 secured to one lead terminal 13A of the thermal switch. The terminal arm 14 has a receptacle portion formed in one end thereof. The receptacle portion of the terminal arm 14 is held in a position corresponding to the socket aperture 12F when the terminal arm 14 has been inserted in the common terminal cavity 12C. A tab terminal 15 is secured to the other lead terminal 13B of the thermal switch 13. In the embodiment, the terminal arm 14 and the tab terminal 15 secured to the lead terminals 13A and 13B of the thermal switch 13 respectively extend from the lead terminals in the opposite directions parallel with the casing of the thermal switch 13 in the longitudinal direction thereof, whereby both of the terminal arm 14 and the tab terminal 15 are accommodated in the single terminal cavity 12C in a row. A slit 12H is formed in an outer side wall of the terminal cavity 12C so as not to prevent insertion of the lead terminals 13A and 13B when the terminal arm 14 and the tab terminal 15 are accommodated in the terminal cavity 12C. A receptacle type terminal strip (not shown) secured to one end of the other lead wire of the motor 4 is connected to the tab terminal 15 so as to hold the same.

Figure 7:
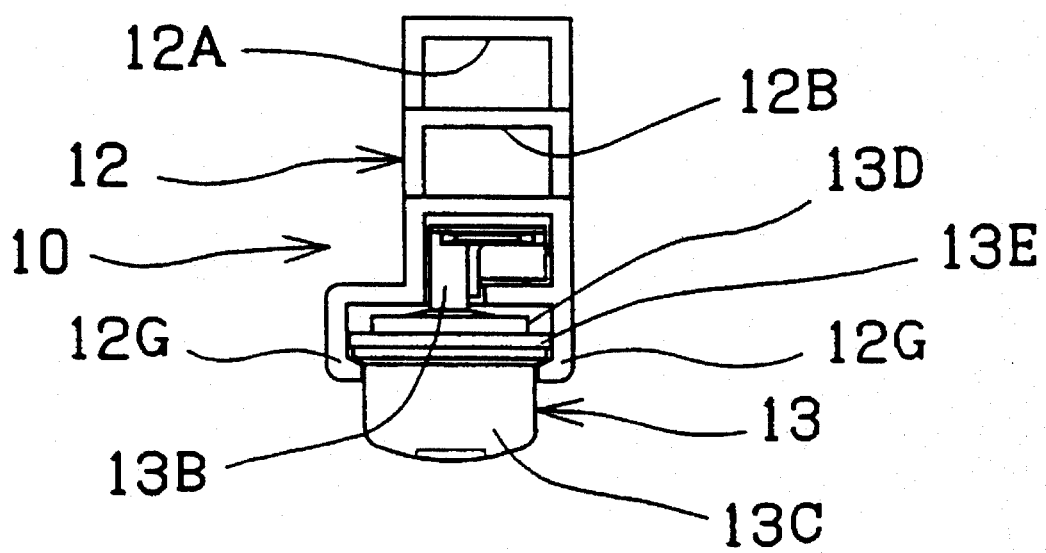
FIG. 7 is a side view as viewed in the direction of arrow B in FIG. 6.

The thermal switch 13 comprises a metal casing 13C having an open end and a header plate 13D hermetically closing the open end of the metal casing 13C. The metal casing 13C and the header plate 13D integrally form a flange 13E peripherally extending along the open edge of the metal casing 13C as best shown in FIGS. 6 and 7. The flange 13E includes a portion parallel with the peripheral open edge of the metal casing 13C. In order that the thermal switch 13 can withstand high pressure in the hermetic housing of the compressor, the header plate 13D is formed of a metal plate having a relatively large thickness, whereas the casing 13C is formed of a metal plate having a thickness smaller than the header plate 13D. The casing 13C has a dome-shaped section so as to compensate for stiffness against the external high pressure.

Figure 3:
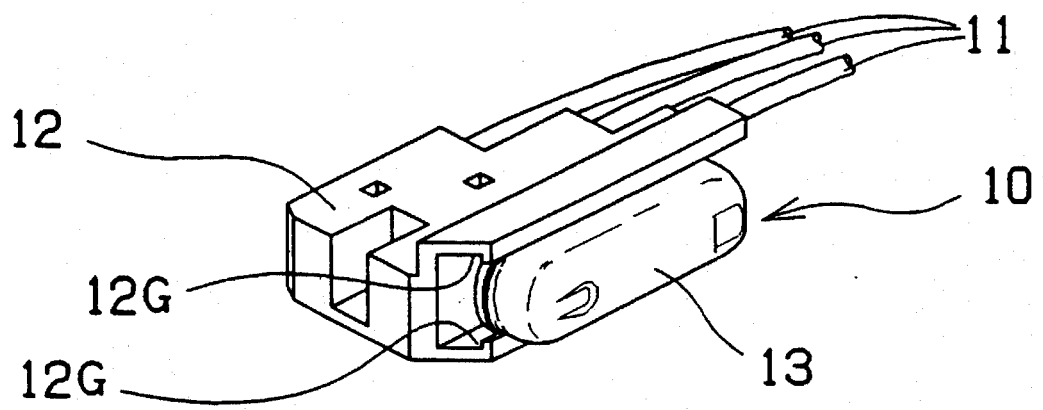
FIG. 3 is a perspective view of the thermal protector.

Referring to FIGS. 3, 4A and 4B, the cluster socket 12 has a pair of ribs or a pair of rail-shaped protector holding portions 12G which hold the thermal switch 13 and which is formed on the same side that the slit 12H is formed. The holding portions 12G extend in parallel with the terminal cavity 12C. The holding portions 12G include portions having ends opposed to each other and small hook-shaped sections respectively. A space between the opposed ends of the hook-shaped portions is so set as to permit longitudinal insertion of the casing 13C of the thermal switch 13. Consequently, when the casing 13C is caused to enter the space in the longitudinal direction with the casing 13C being located outside, the thermal switch 13 is moved in the direction normal to the longitudinal direction thereof so that the holding portions 12G hold the flange 13E in such a manner that the thermal switch 13 is prevented from being detached from the cluster socket 12. In entrance of the thermal switch 13, the terminal arm 14 thereof is first inserted through the right-hand open end of the common terminal cavity 12C as viewed in FIG. 6. The tab terminal 15 is drawn into the terminal cavity 12C when both lead terminals 13A and 13B are then caused to slide into the slit 12H. When reaching the innermost of the terminal cavity 12C, the receptacle portion of the terminal arm 14 assumes a position corresponding to the socket aperture 12F. At this position, a resilient portion of the terminal arm 14 serving as a latch against return of the receptacle is held at a predetermined position, whereby the terminal arm 14 is held in the terminal cavity 12C. Consequently, the thermal switch 13 is integrally coupled to the cluster socket 12 with most of its casing 13C being exposed at one side of the socket.

The mounting of the above-described thermal protector 10 onto the terminal assembly 8 and its operation will be described. The terminal pins 8A extending from the backside of the terminal assembly 8 are fitted into the socket apertures 12D, 12E and 12F inside the compressor housing respectively. Thus, the thermal protector 10 is mounted on the terminal assembly 8 as shown in FIGS. 1 and 2. During the mounting, a tensile or torsional force caused at the side of the motor lead wires 11 may act via the tab terminal 15 so as to separate the thermal switch 13 from the cluster socket 12. However, since the thermal switch 13 is firmly held by the holding portions 12G, the terminals can be prevented from being deformed or damaged. The compressor cap 2 with the terminal assembly 8 to which the thermal protector 10 is mounted is hermetically coupled to the lower container 3.

The temperature of refrigerant in the compressor housing is at or below a predetermined value during normal operation of the compressor, and a current flowing into the motor is also at or below a rated current. The operating temperature of the thermally responsive element of the thermal switch 13 is so set as to be slightly higher than the predetermined refrigerant temperature when the motor current is the rated current, so that the motor 4 is kept to be energized. When the motor 4 gets into a locked-rotor condition or an overload condition due to occurrence of an abnormal condition, the winding current and temperature of the motor 4 are increased and the temperature of the refrigerant is also increased. Under such a condition, the casing 13C of the thermal switch 13 is brought into contact with the refrigerant such that the refrigerant temperature is transmitted to the internal thermally responsive element (not shown). The thermally responsive element cuts off the electric current path, thereby protecting the motor 4 against burnout.

The thermal protector of the present invention is mounted inside the hermetic electrically-driven compressor of the high-pressure housing type in the foregoing embodiment. The thermal protector may be mounted to the hermetic electrically-driven compressors of the low-pressure housing type when the protector can be so mounted as to reliably follow the increase in the refrigerant temperature under the abnormal condition.

Although the thermal switch 13 has two lead terminals in the foregoing embodiment, the casing of the thermal switch 13 may serve as one of the lead terminals with provision of the other lead terminal. In this case, slight change in the form of each terminal strip is required. Furthermore, the lead wire of the motor may be directly connected to an outer metal portion of the thermal switch without use of the tab terminal.

In the foregoing first embodiment, one of the terminal pins 8A of the terminal assembly 8 or more specifically, the common terminal is disposed so as to be nearer to the center of the compressor housing. With such disposition of the common terminal pin, the common terminal cavity 12C of the cluster socket 12 is disposed at one side thereof where the thermal switch 13 is coupled to the socket. Consequently, when the thermal protector 10 is mounted to the terminal assembly 8, the casing 13C of the thermal switch 13 is positioned nearer to the center of the compressor housing and the lead wires 11 of the motor extend near the inner wall of the compressor housing, as shown in FIG. 2. The following modified forms of the thermal protector are considered in relation to disposition of the parts inside the compressor housing and an allowed space therefor.

Figure 9:
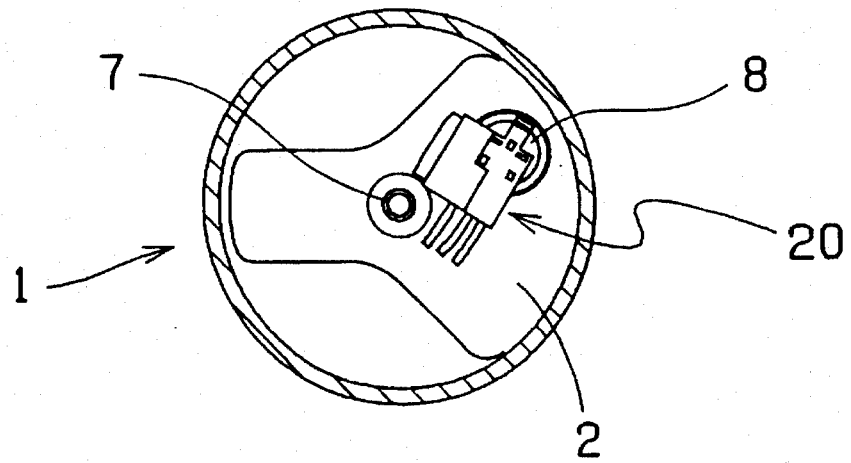
FIG. 9 is a section taken along line C—C in FIG. 8.
Figure 10:
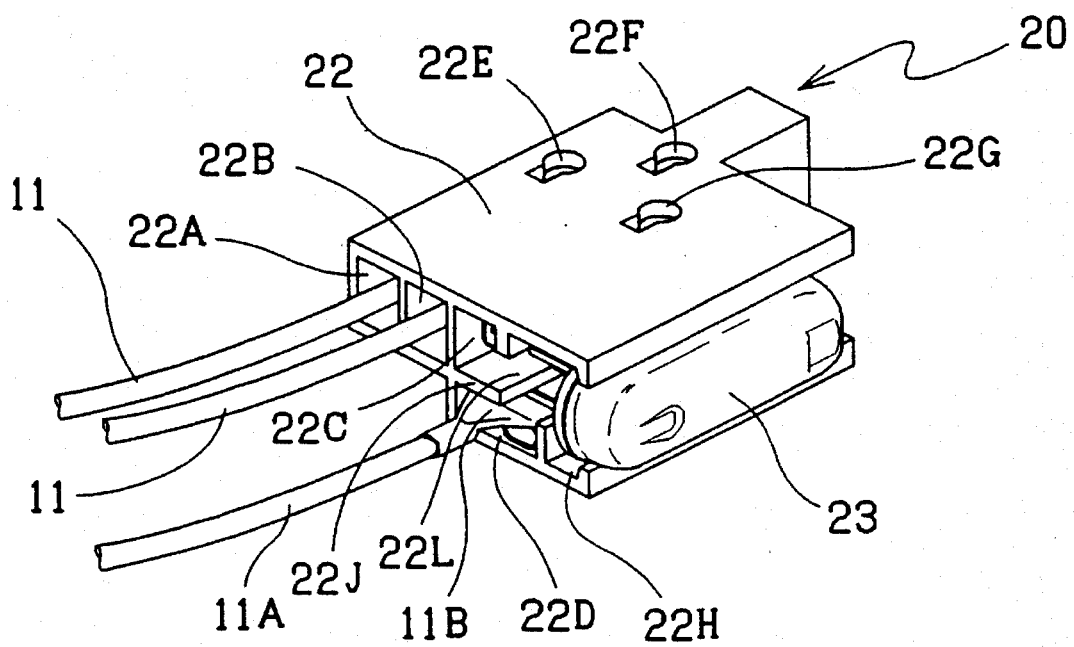
FIG. 10 is a perspective view of the thermal protector.
Figure 11:
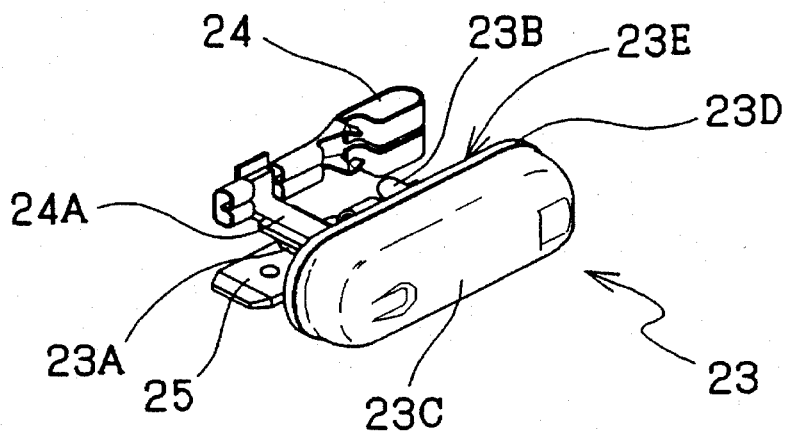
FIG. 11 is a perspective view of a thermal switch which composes the thermal protector and to which a terminal arm and a tab terminal are secured.
Figure 16A:
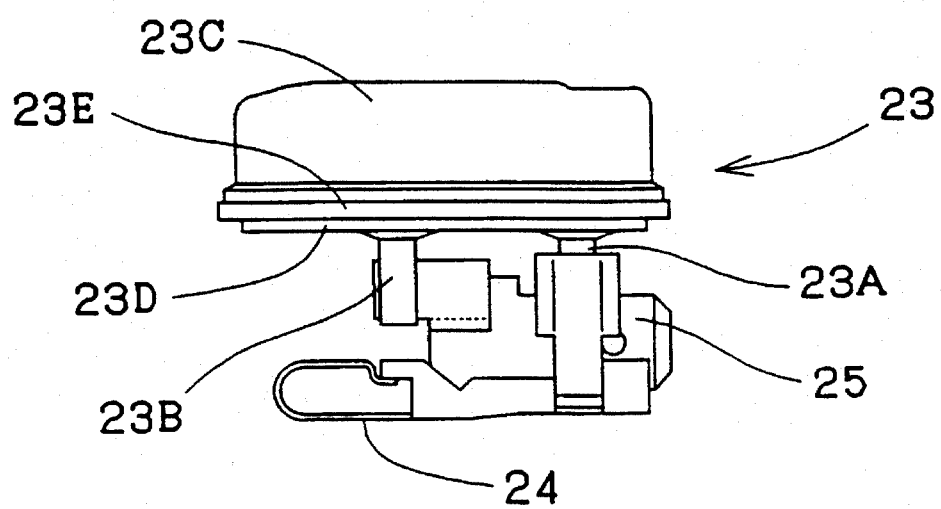
FIGS. 16A and 16B are a plan view and a front view of the thermal switch as shown in FIG. 11 respectively.
Figure 16B:
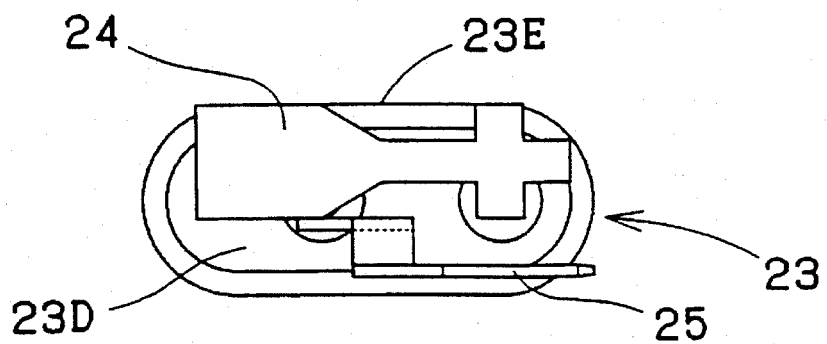

FIGS. 8 to 16B show a second embodiment of the present invention. The second embodiment shows the case where the length of the cluster socket 22 is reduced due to spatial or designing requirement. Regarding the hermetic compressor shown in FIGS. 8 and 9, identical parts are labeled by the same reference numerals as in the first embodiment, and description of these identical parts is eliminated. Referring to FIGS. 10 to 16B, the thermal switch 23 basically has the same construction as that in the foregoing embodiment except for the constitution of the lead terminals 23A and 23B. The casing 23C enclosing the thermally responsive element and other parts none of which are shown is hermetically closed by the header plate 23D which forms the flange 23E integrally with the casing 23C and which includes the parallel portion as shown in FIGS. 16A and 16B. The thermal switch 23 employed in the thermal protector 20 of the second embodiment also has two lead terminals 23A and 23B insulated from the header plate 23D. A terminal arm 24 having a shape slightly different from that of the terminal arm 14 in the first embodiment is secured to the lead terminal 23A. The terminal arm 24 has at its one end a receptacle portion into which one of the terminal pins 8A of the terminal assembly 8 is fitted. The terminal arm 24 is secured at the base thereof to an L-shaped support 24A by the welding, which support is further secured to the lead terminal 23A by the welding. The terminal arm 24 thus secured to the lead terminal 23A extends in parallel with the thermal switch 23 in the longitudinal direction thereof. However, the terminal arm 24 does not extend over the end of the casing 23C as in the first embodiment. The terminal arm 24 extends from the end of the support 24A over the other lead terminal 23B and is then folded back as shown in FIG. 11. The folded end of the terminal arm 24 is located near the opposite end of the casing 23C. A tab terminal 25 which is secured to the other lead terminal 23B has a base bent into the shape of a crank. The tab terminal 25 also extends in parallel with the thermal switch 23 in the longitudinal direction thereof but extends over the lead terminal 23A. The end of the tab terminal 25 is located near the end of the casing 23C at the side of the lead terminal 23A as shown in FIG. 16A. Accordingly, each of the terminal arm 24 and the tab terminal 25 extends in the direction of the other.

Figure 12A:
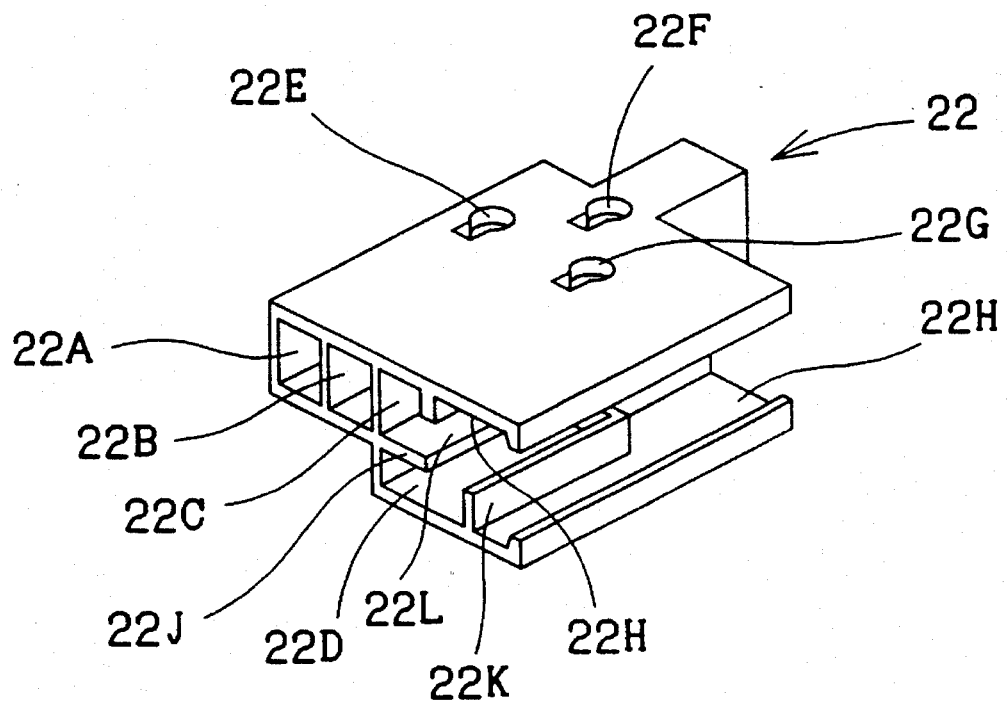
FIGS. 12A and 12B are perspective views of a cluster socket, showing the backside and the top respectively.
Figure 12B:
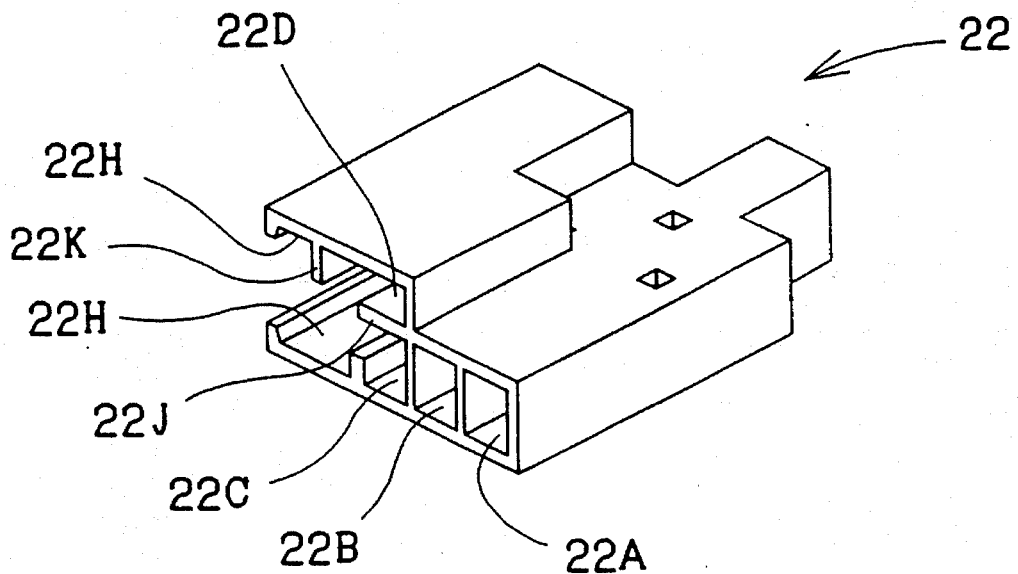

Referring to FIGS. 10, 12A and 12B, the cluster socket 22 is formed from the insulating material such as the synthetic resin into the shape of a slightly flat box. The cluster socket 22 has in the upper face thereof a plurality of socket apertures 22E, 22F and 22G into which the terminal pins 8A of the terminal assembly 8 extending inside the compressor housing are fitted respectively, as shown in FIG. 10. The terminal cavities 22A, 22B and 22C are formed in the cluster socket 22 so as to extend from one side thereof in the same direction. The socket apertures 22E, 22F and 22G are open to the innermost of the terminal cavities 22A, 22B and 22C at a right angle respectively. The terminal cavity 22C located at one side of the socket corresponds to the common lead wire of the motor. When the terminal arm 24 of the thermal switch 23 is inserted to the innermost of the terminal cavity 22C, the receptacle portion of the terminal arm 24 is positioned just under the socket aperture 22G for the common terminal. In this state, the terminal arm 24 is held in the terminal cavity in the same manner as in the first embodiment.

The receptacle terminals (not shown) secured to the ends of the lead wires extending from the primary and auxiliary windings of the motor are inserted into the other two terminal cavities 22A and 22B respectively. The receptacle terminals, when reaching the innermost of the cavities, are held at the positions corresponding to the socket apertures 22E and 22F respectively. The three terminal cavities 22A, 22B and 22C are disposed in parallel with one another so that the upper faces thereof are planar with one another. The common terminal cavity 22C is provided with an auxiliary common terminal cavity 22D which is adjacent to the lower side of the cavity 22C and is enlarged transversely. The two terminal cavities 22C and 22D are partially partitioned by a partition 22J. The cluster socket 22 has near the open end of the terminal cavity 22C a notch 22L which communicates the auxiliary cavity 22D to the cavity 22C. Thus, the terminal cavity 22C is not formed into such a discrete cavity as the other terminal cavities 22A and 22B. The notch 22L is provided so as not to prevent insertion of the lead terminals 23A and 23B and the parts attached to them.

Figure 13:
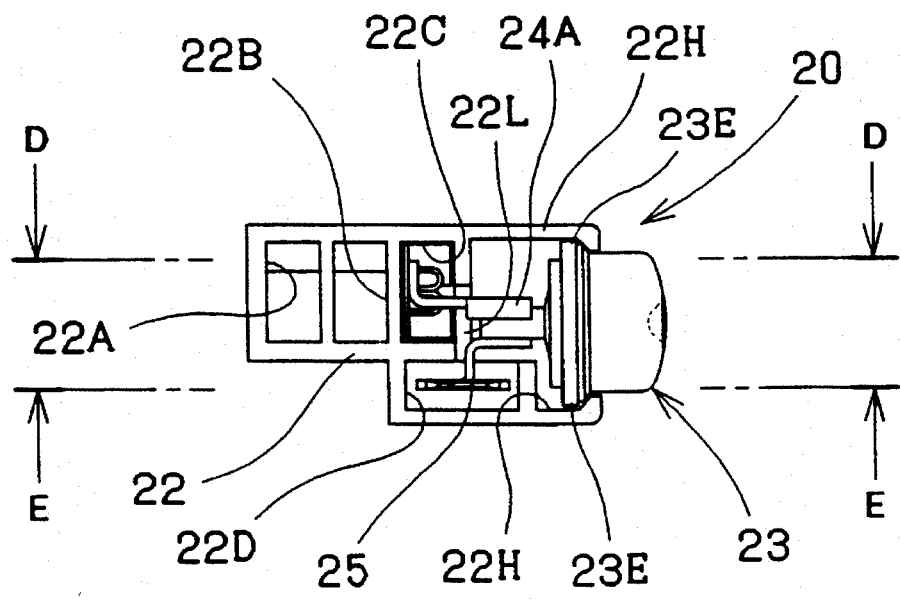
FIG. 13 is a side view of the thermal protector.
Figure 14:
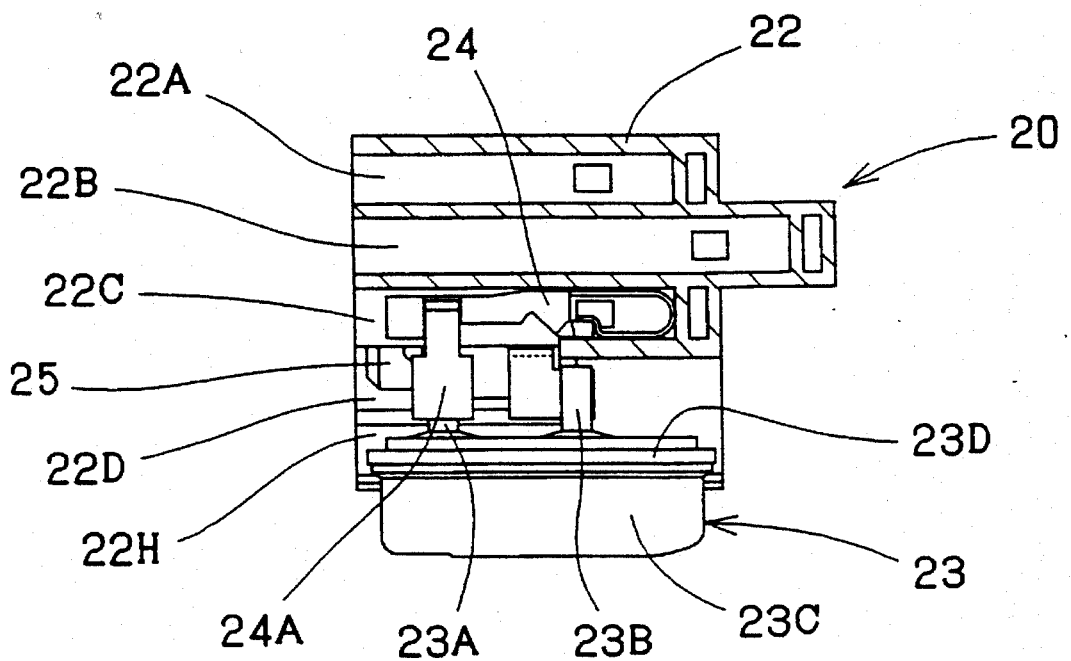
FIG. 14 is a section taken along line D—D in FIG. 13.
Figure 15:
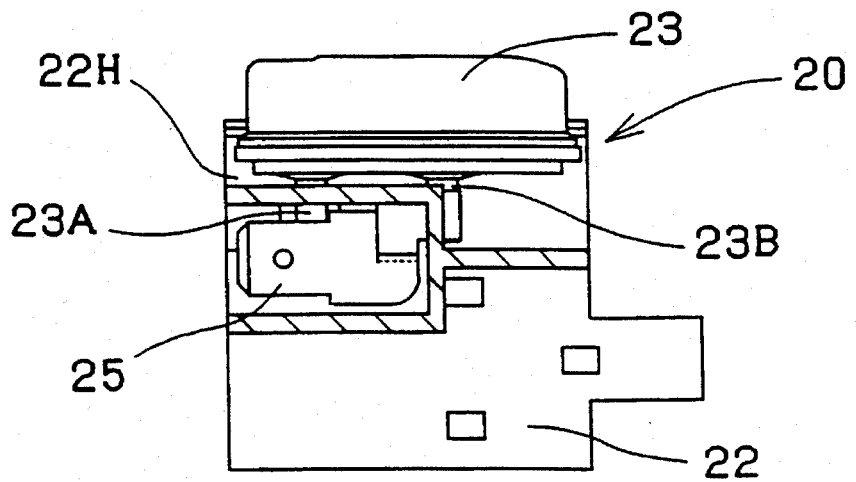
FIG. 15 is a section taken along line E—E in FIG. 13.

When the terminal arm 24 is inserted into the two-storied common terminal cavity 22C communicating at its open end with the auxiliary cavity 22D, the tab terminal 25 is simultaneously inserted into the auxiliary cavity 22D. The receptacle portion 11B of the common lead wire 11A of the motor is inserted through the open end of the cavity 22D such that the tab terminal 25 is fitted into the receptacle portion 11B. Upper and lower walls of the socket 22 defining the common terminal cavities 22C and 22D extend in parallel with each other, thereby forming the holding portions 22H. The holding portions 22H have hook portions which are formed on the extending ends of the upper and lower walls of the socket 22 respectively so as to be opposed to each other and each have a small section. The flange 23E of the thermal switch 23 is held by the hook portions of the holding portions 22H with a larger part of the casing 23C being exposed when the thermal switch 23 is coupled to the cluster socket 22, as shown in FIGS. 10 and 13.

A partition wall 22K having a smaller height is formed on one of the holding portions 22H to guide the tab terminal 25 into the auxiliary cavity 22D. The partition wall 22K prevents a compulsive force from being applied to each terminal when the thermal switch 23 is inserted into the space between the holding portions 22H and when the thermal switch 23 is subsequently held by the holding portions 22H.

The thermal protector of the second embodiment differs from that of the first embodiment in that the cluster socket 22 has a double-cavity structure for supporting the lead terminals 23A and 23B of the thermal switch 23. The thermal protector of the second embodiment is identical with that of the first embodiment in the construction of the holding portions 22H holding the flange 23E of the thermal switch 23, that one of the lead terminals of the thermal switch has a receptacle portion at the end thereof and corresponds to one of the terminal pins 8A of the terminal assembly 8, and that the other terminal is provided with the tab terminal 25, which is connected to the common terminal of the motor. Accordingly, the mounting of the thermal protector to the terminal assembly 8 and the operation thereof are substantially the same as those in the first embodiment. More specifically, the receptacles (not shown) secured to the ends of the lead wires 11 of the motor are inserted into the terminal cavities 22A and 22B to be thereby held therein as shown in FIG. 10. The tab terminal 25 is fitted into the receptacle 11B of the common lead wire 11A.

Figure 8:
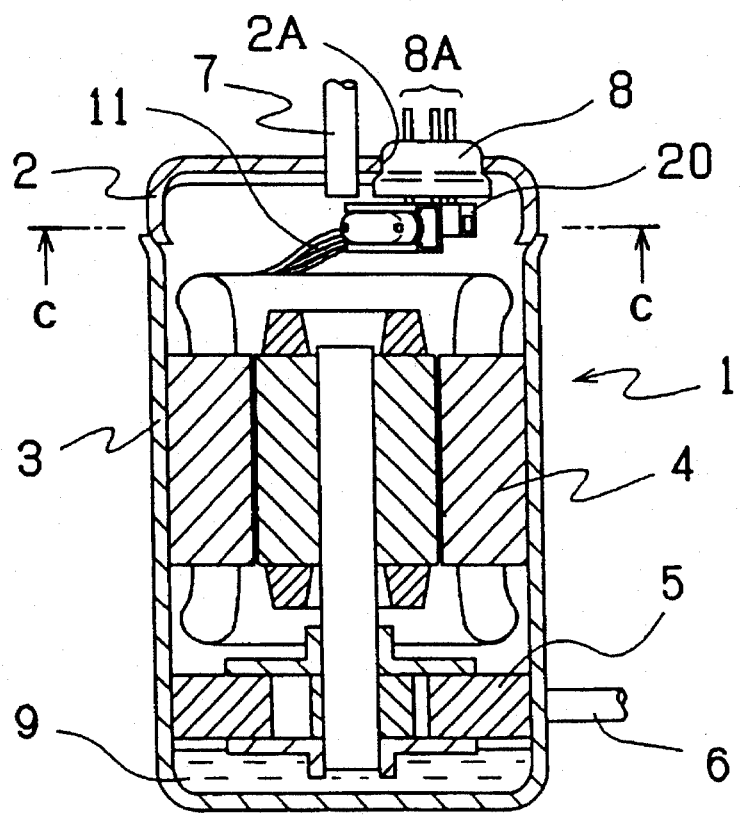
FIG. 8 is a longitudinal section of the compressor in which a thermal protector of a second embodiment in accordance with the present invention is provided.

In this state, the terminal pins 8A of the terminal assembly 8 are fitted into the socket apertures 22E, 22F and 22G respectively, so that the thermal protector 20 is mounted to the terminal assembly 8 inside the compressor housing as shown in FIGS. 8 and 9. The thermal protector 20 of the second embodiment provides the same motor protecting operation as described in the first embodiment.

FIGS. 17 to 24 illustrate a third embodiment of the present invention. The thermal protector 30 of the third embodiment is suitable for the case where the common terminal is located near the inner wall of the cap 2 in view of the arrangement of the terminal pins 8A and the case where the thermal switch 33 needs to be located closer to the motor for quick detection of the heat generated by the motor.

Figure 20:
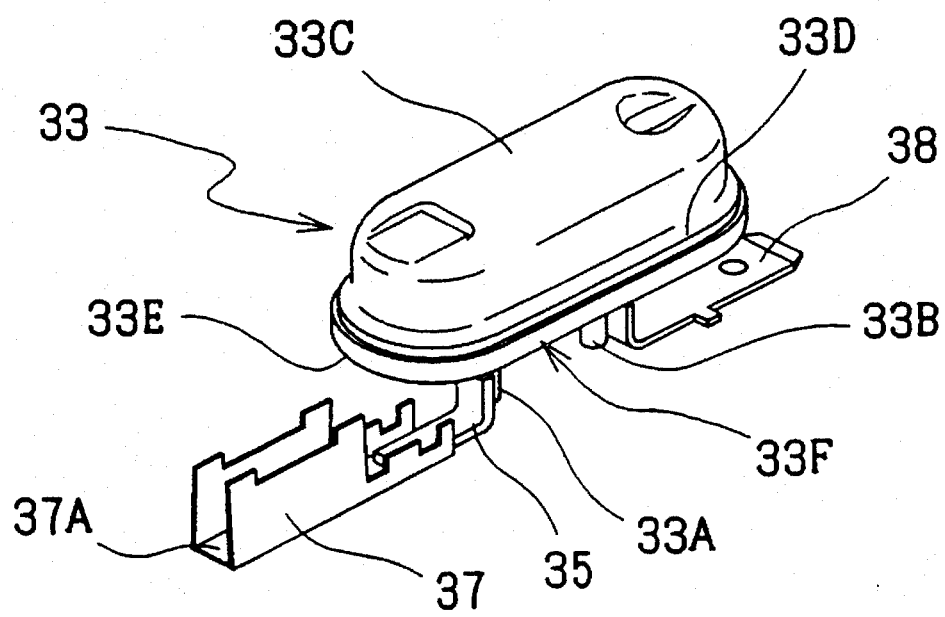
FIG. 20 is a perspective view of a thermal switch to which the terminal arm and the tab terminal are secured.
Figure 21A:
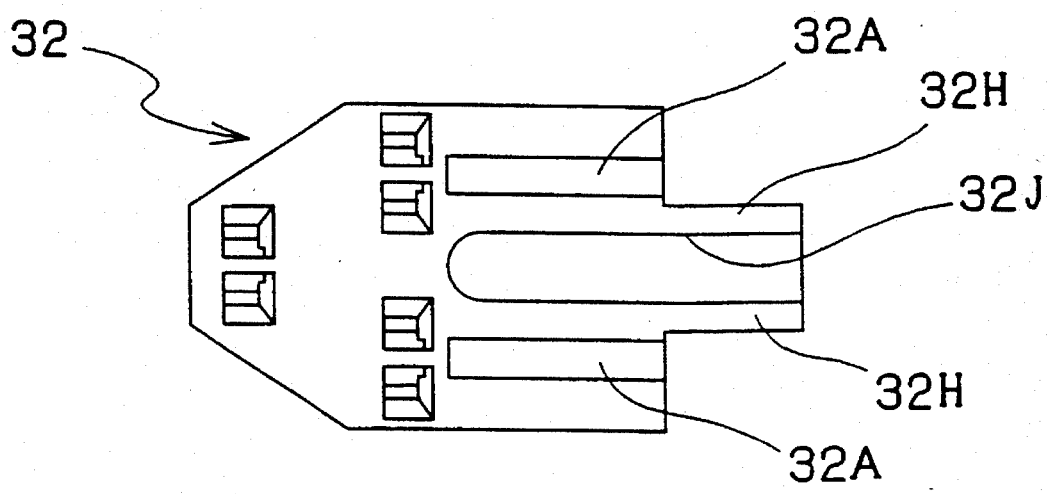
FIGS. 21A, 21B and 21C are a plan view, a bottom view and a side view of a cluster socket composing the thermal protector.
Figure 21B:
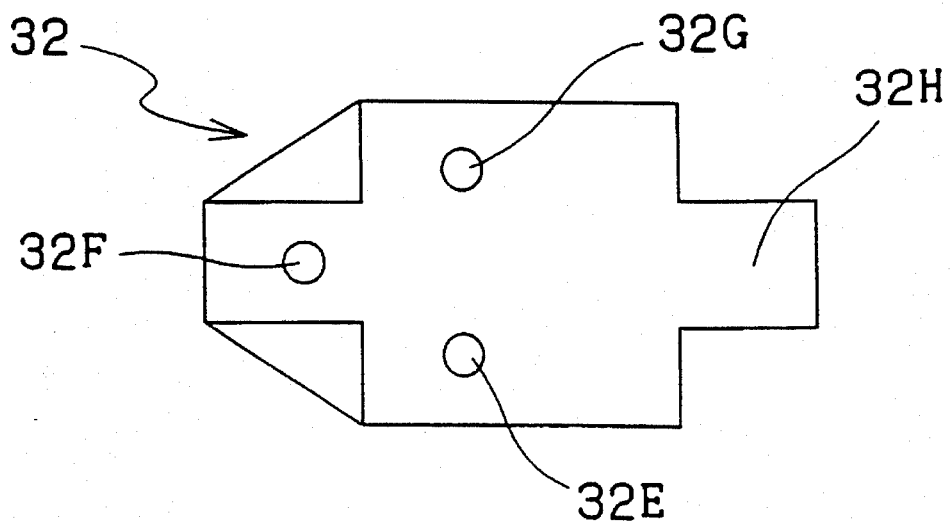
Figure 21C:
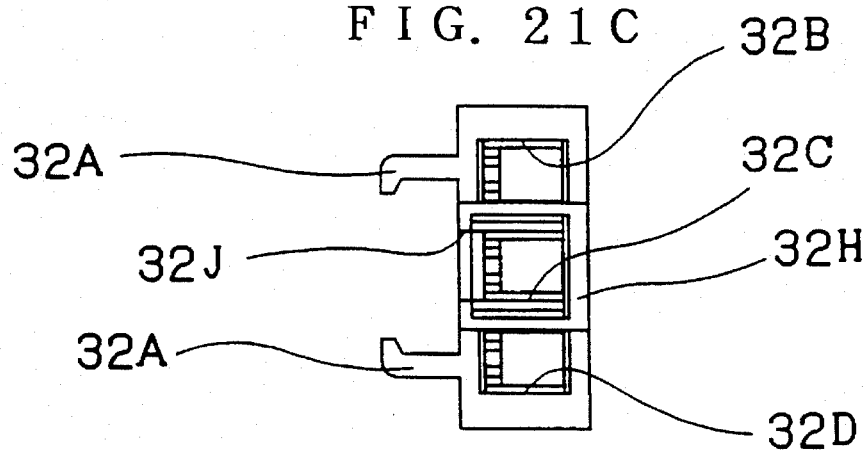
Figure 22:
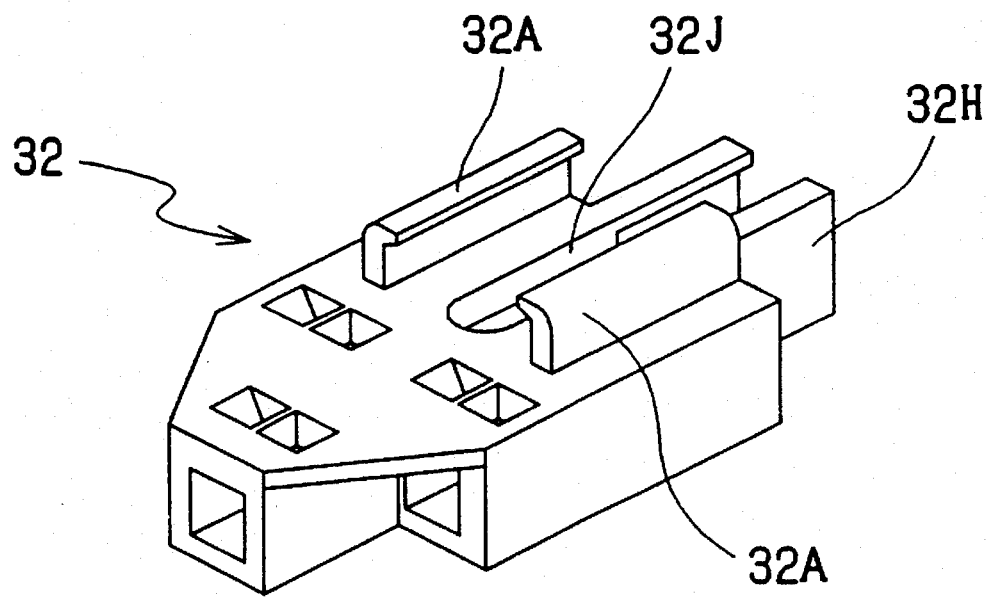
FIG. 22 is a perspective view of the cluster socket.
Figure 24:
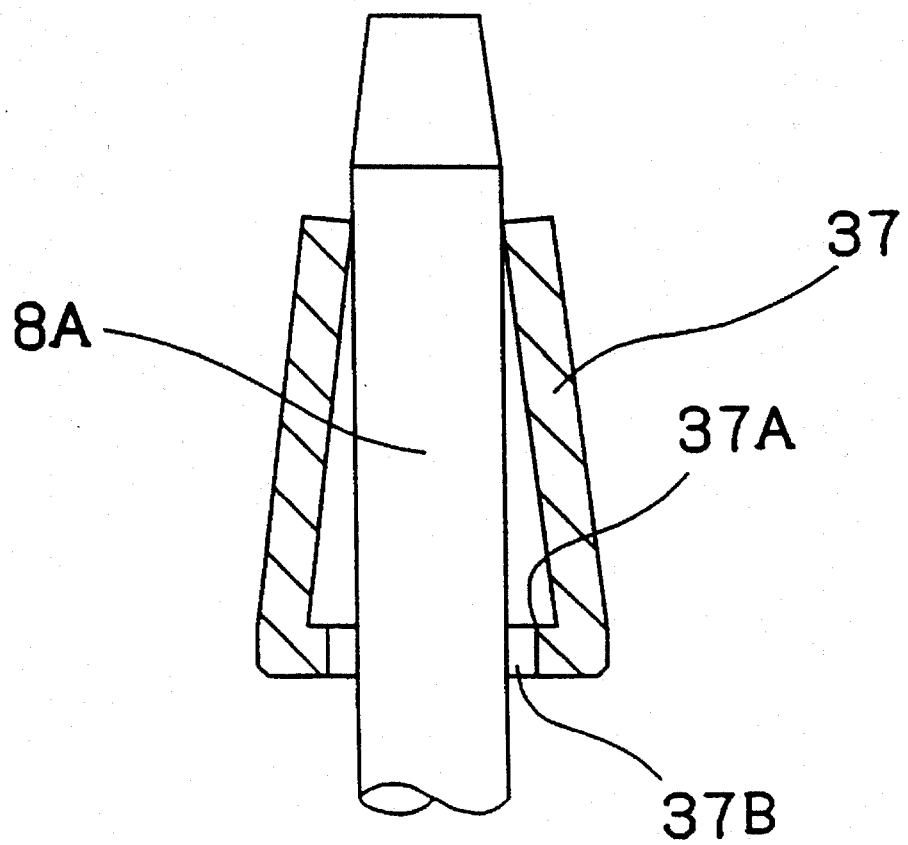
FIG. 24 is an enlarged section of a receptacle portion of the thermal switch with a terminal being received by the receptacle portion.

Referring to FIG. 20, the terminal arm 35 is secured to one lead terminal 33A of the thermal switch 33 of the third embodiment by way of the welding. The terminal arm 35 is bent at its L-shaped base and extends in parallel with the thermal switch 33 in the longitudinal direction thereof as in the first embodiment. The terminal arm 35 has at its end a receptacle portion 37 into which one of the terminal pins 8A is fitted. The receptacle portion 37 has a simplified form as compared with those in the foregoing embodiments. The receptacle portion 37 is so formed as to be held in the innermost of the cavity when the terminal arm 35 is inserted into the cavity of the cluster socket 32. The tab terminal 38 is secured to the other lead terminal 33B of the thermal switch. The tab terminal 38 extends in parallel with the casing of the thermal switch 33 in the longitudinal direction thereof, which direction is opposite to the direction in which the terminal arm 35 extends. The receptacle portion 37 has a through-hole 37B formed in a portion 37A corresponding to the common terminal pin of the terminal assembly 8 as shown in FIG. 24. The common terminal pin 8A is inserted through the hole 37B. The casing 33C of the thermal switch 33 encloses the thermally responsive switching mechanism (not shown) therein and is hermetically closed by the header plate 33E as in the foregoing embodiments. A slightly enlarged peripheral open edge 33D of the casing 33C and the peripheral edge of the header plate 33E integrally form a flange 33F including parallel portions at opposite sides of the casing 33C in the same manner as in the foregoing embodiments.

The cluster socket 32 is formed of the insulating material such as synthetic resin into the shape of a flat box. The cluster socket 32 has three terminal cavities 32B, 32C and 32D. The receptacles (not shown) fixed to the ends of the motor lead wires and the receptacle portion 37 of the terminal arm 35 are positioned so as to correspond to the socket apertures 32E, 32F and 32G respectively when innermostly inserted into the respective cavities. The receptacles and the receptacle portion 37 are held in the respective cavities by known holding mechanism. In the third embodiment, the central terminal cavity 32C supports the thermal switch 33. The central portion of the cluster socket 32 has a projected portion 32H through which the central cavity 32C extends. The projected portion 32H serves as an insulating cover for covering the tab terminal 38. The insulating cover 32H may not be provided when there is no problem of insulation in the wire connection. A slit 32J is formed in the side of the socket 32 opposite to that in which the socket aperture 32F is formed. The slit 32J permits entrance of both terminals 33A and 33B when the terminal arm 35 is inserted into the central common terminal cavity 32C.

A pair of ribs 32A serving as the holding portions are formed on the side of the socket 32 having the slit 32J so as to be symmetrical about the slit 32J and parallel with the central terminal cavity. The ribs 32A have respective hook-shaped ends which are opposed to the other, so that the flange 33F can be held by the holding portions 32A.

Figure 23:
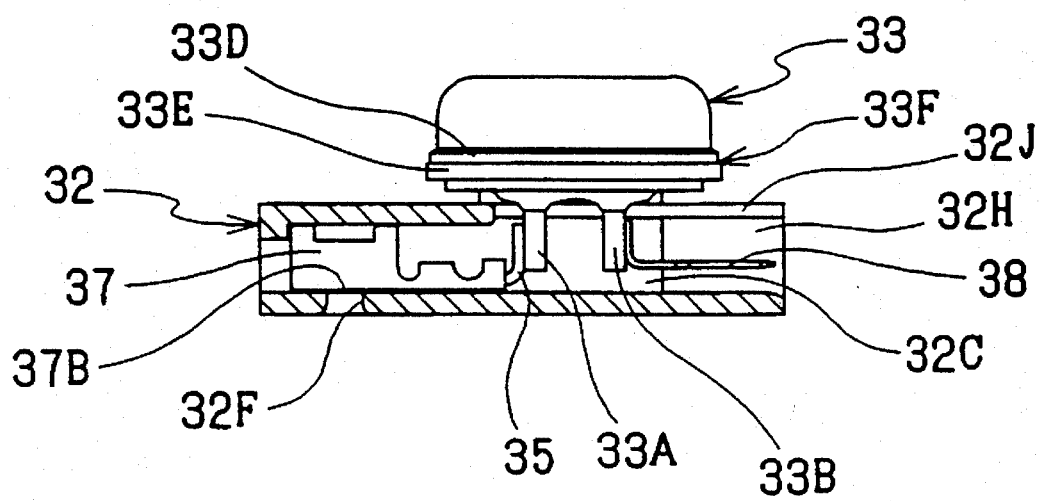
FIG. 23 is a longitudinal section of the thermal protector.

The terminal arm 35 is inserted into the common terminal cavity 32C and simultaneously, the flange 33F is held by the holding portions 32A. When reaching the innermost of the cavity 32C, the terminal arm 35 is held therein at a position where the through hole 37B of the receptacle portion 37 corresponds to the common socket aperture 32F as shown in FIG. 23. The tab terminal 38 facing the cavity open end of the insertion side is inserted into the receptacle (not shown) fixed to the end of the common lead wire 11A of the motor. The receptacles fixed to the ends of the lead wires extending from the motor primary and auxiliary windings are inserted into the corresponding cavities to be held therein respectively. Thus, the assembly of the thermal protector 30 is completed.

Figure 17:
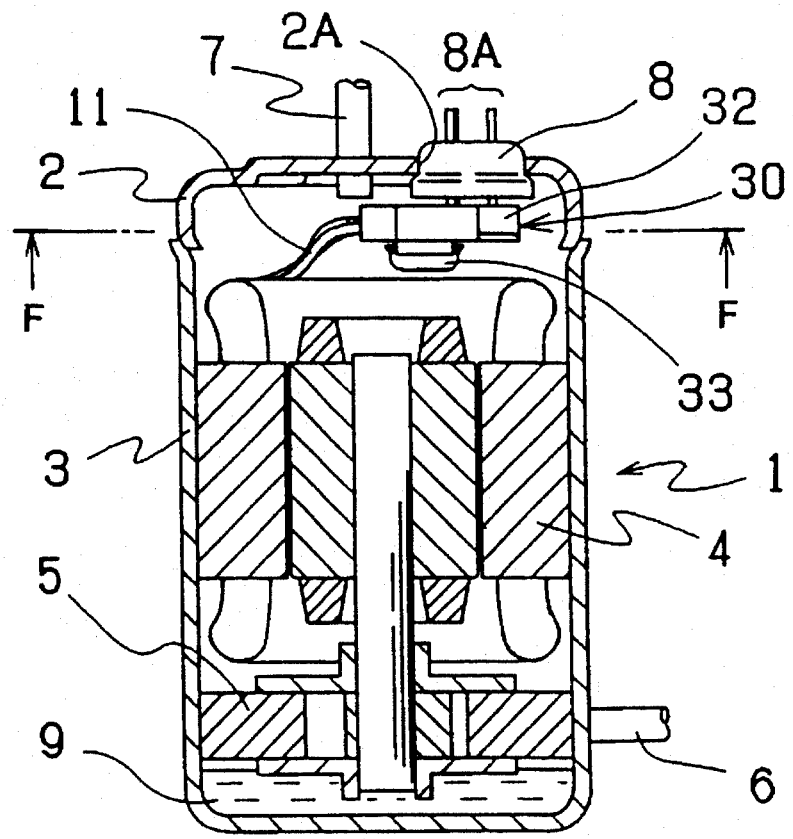
FIG. 17 is a longitudinal section of a hermetic electrically-driven compressor in which a thermal protector of a third embodiment in accordance with the present invention is provided.
Figure 18:
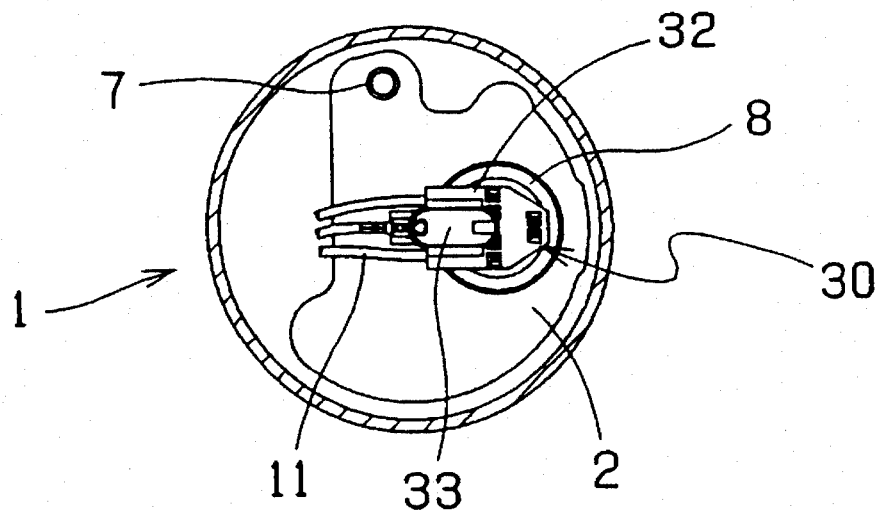
FIG. 18 is a section taken along line F—F in FIG. 17.
Figure 19:
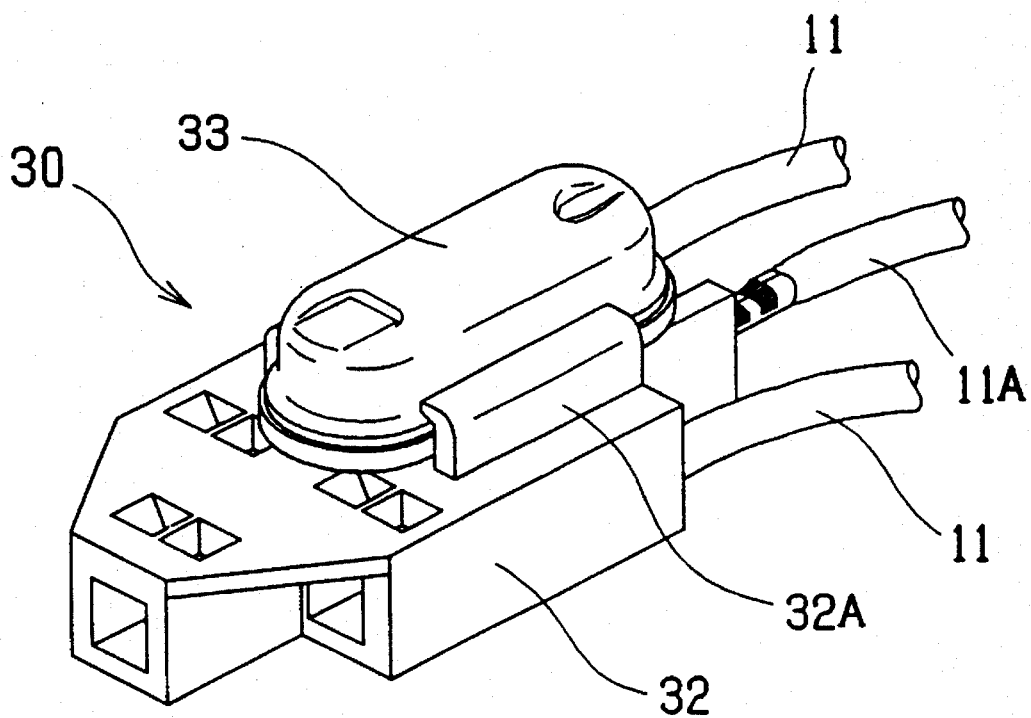
FIG. 19 is a perspective view of the thermal protector.

The connection of the thermal protector 30 to the terminal assembly 8 and its operation are the same as in each of the foregoing embodiments. The terminal pins 8A extending inside the compressor housing are fitted into the socket apertures 32E, 32F and 32G so that the thermal protector 30 is connected to the terminal assembly 8 as shown in FIGS. 17 and 18. In the third embodiment, particularly, the heat responsiveness of the thermal switch 33 can be improved since the thermal switch 33 is located nearer to the motor 4 when the thermal protector 30 is mounted to the terminal assembly 8 inside the compressor housing. However, such disposition of the thermal switch as described above sometimes results in a problem of insufficiency in the insulation distance between the thermal switch 33 and the motor 4. This problem can occur in the foregoing embodiments.

Figure 25:
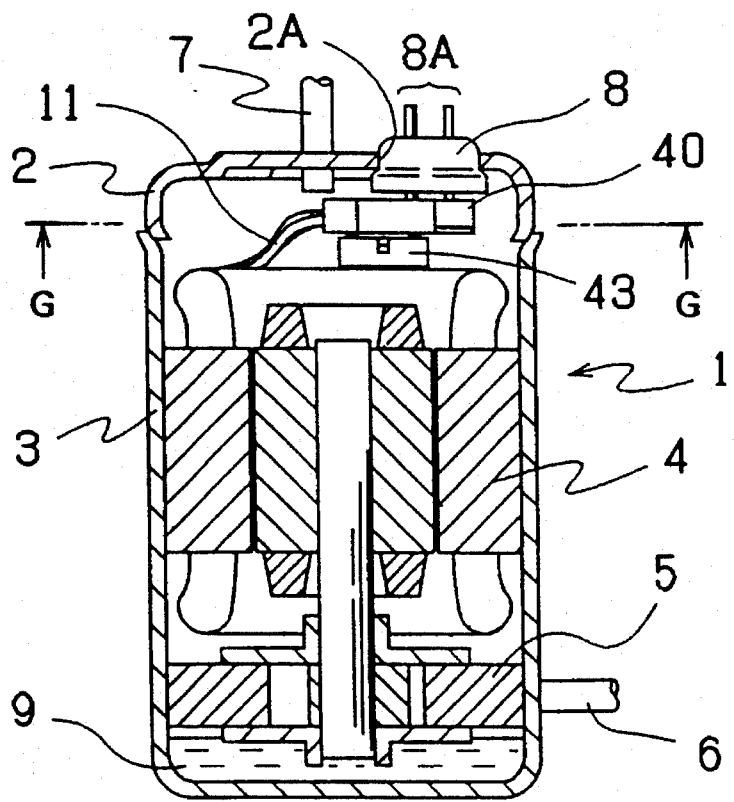
FIG. 25 is a longitudinal section of a hermetic electrically-driven compressor in which a thermal protector of a fourth embodiment in accordance with the present invention is provided.
Figure 26:
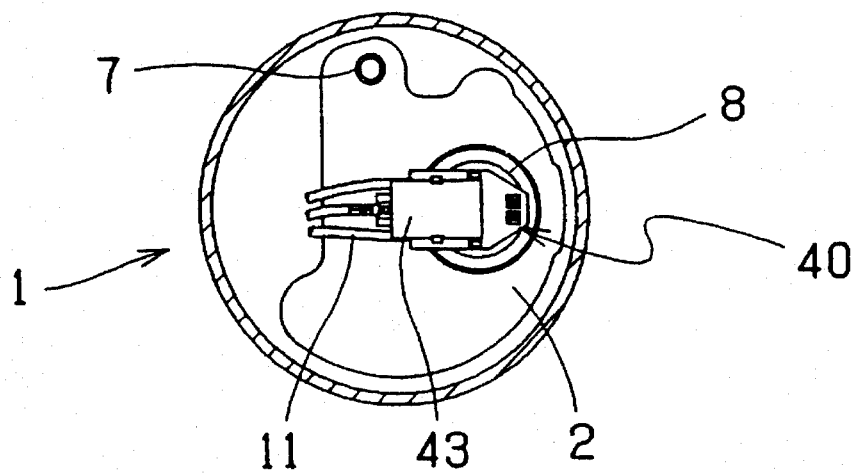
FIG. 26 is a section taken along line G—G in FIG. 25.
Figure 27:
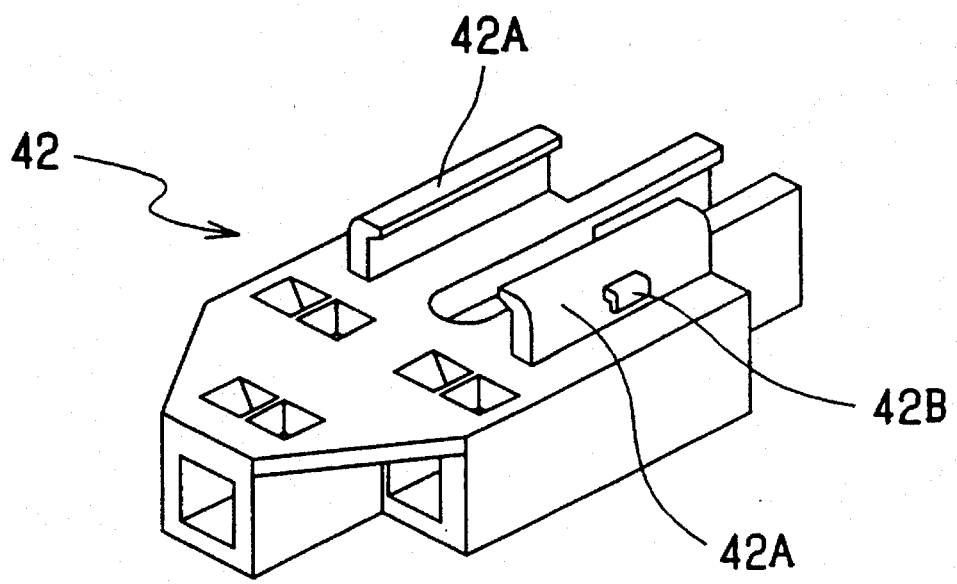
FIG. 27 is a perspective view of a cluster socket composing the thermal protector.
Figure 28:
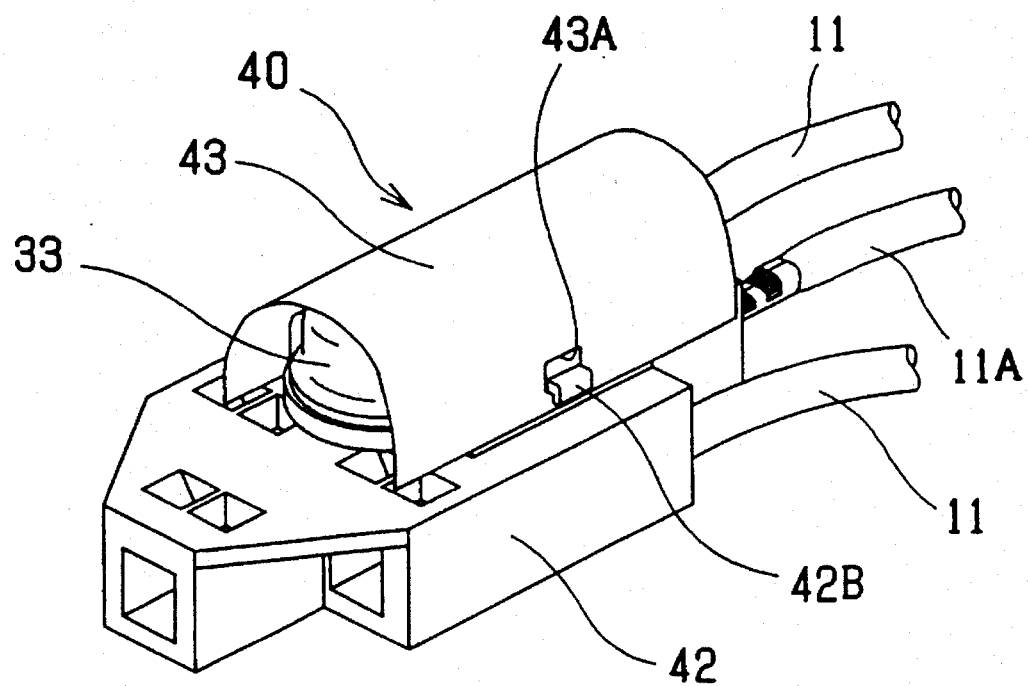
FIG. 28 is a perspective view of the thermal protector.

A fourth embodiment provides a solution to the above-described problem. Referring to FIGS. 25 to 28, each rib 42A has another hook 42B formed on the central potion of the outer side wall thereof. An insulating cover 43 is formed from an elastic insulating thin film such as a polyester film or aramid paper. The insulating cover 43 has two engagement holes 43A formed in the opposite sides thereof. The engagement holes 43A are engaged with the hooks 42B respectively. With insertion of the thermal switch 33 into the socket, tension is applied to the insulating cover 43 such that the engagement holes 43A are prevented from being disengaged from the hooks 42B respectively. The contact of the thermal switch 33 with the flow of refrigerant is somewhat prevented by the insulating cover 43 in the actual use of the thermal protector in the compressor housing as shown in FIGS. 25 and 26. However, the thermal switch 33 is not completely covered by the insulating cover 43, and the refrigerant can flow through spaces at both sides of the thermal switch inside the insulating cover 43. Accordingly, the provision of the insulating cover 43 has no detrimental effect on the responsiveness of the thermal switch. Since the insulating cover 43 is attached to the thermal switch 33 prior to the mounting of the thermal protector 30 to the compressor, troublesome heat treatment as required in the prior art thermal switch covered by the heat-shrinkable tube is eliminated.

Figure 29:
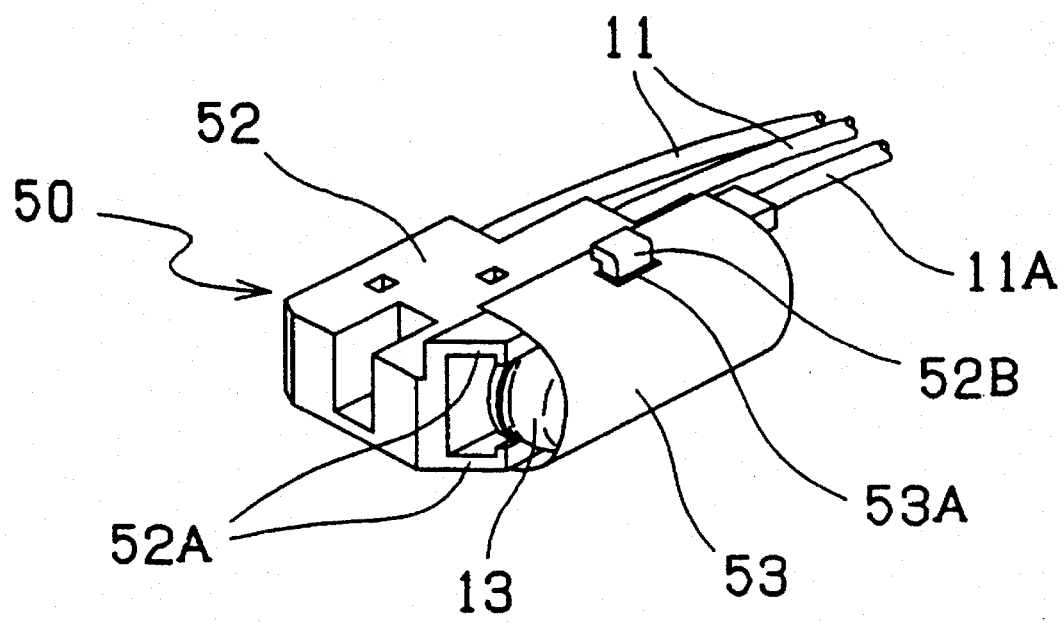
FIG. 29 is a perspective view of a thermal protector of a fifth embodiment in accordance with the present invention, the fifth embodiment being a modified form of the first embodiment as shown in FIG. 3.

The above-described insulating cover 43 may be applied to the thermal protectors of the foregoing embodiments. FIG. 29 illustrates a fifth embodiment wherein the insulating cover is applied to the thermal protector of the first embodiment. Each rib 52A of the cluster socket 50 has a hook 52B formed on the central potion of the outer side wall thereof. The engagement holes 53A formed in the opposite sides of the insulating cover 53 are engaged with the hooks 52B respectively as described above. The same effect can be achieved in the fifth embodiment as in the fourth embodiment. Furthermore, the insulating cover may be applied to the thermal protector of the second embodiment though this is not shown.

Although the thermal switch has been described as having two lead terminals in each of the second and third embodiments, the casing of the thermal switch may serve as one of the lead terminals with provision of the other lead terminal. In this case, slight change in the form of each terminal strip is required. Furthermore, the lead wire of the motor may be directly connected to the terminal of the thermal switch without use of the tab terminal or the ends of the motor windings may be directly connected to the thermal switch.

The thermal protector of each of the second and third embodiments may be mounted to the hermetic electrically-driven compressor of the low-pressure housing type.

Each of the thermal protectors of the foregoing embodiments can be selected in accordance with various designing elements with respect to the interior of the compressor housing, which elements include the location of the common terminal of the motor and electrically or thermally required spacing between the parts. When the provision of the electrical insulation is desired, the insulating cover can be provided by simple addition of the hooks to the holding portions.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A thermal protector for a hermetic electrically-driven compressor which includes an electric motor and a hermetic housing having a wall in which a hermetic terminal assembly having a plurality of terminal pins is mounted, the protector being mounted inside the compressor housing so as to be opposed to the terminal assembly, the protector comprising:

a thermal switch comprising:
a metal casing having a generally dome-shaped section and an open end;
a thermal switch mechanism accommodated in the casing;
a header plate hermetically closing the open end of the casing and having a portion parallel to the metal casing in the longitudinal direction thereof, the casing and the header plate integrally forming a flange on the peripheral edges thereof when the header plate is secured to the casing to hermetically close the open end of the casing; and
two terminals one of which is provided with a receptacle into which one of the terminal pins of the terminal assembly is fitted, the other terminal being connected to a common lead wire of the motor; and a cluster socket having a plurality of terminal cavities provided for connecting windings of the motor to the terminal assembly, the socket including a body which has a face further having a pair of holding portions for holding the flange, the holding portions having at one of the ends, hook-shaped portions respectively, the socket further having a common terminal cavity parallel to the holding portions;

wherein the casing and the socket are integrally connected together such that a larger part of the casing is exposed outside the socket body, when the flange is held by the holding portions and the receptacle is inserted to a position where the same is opposed to said one terminal pin of the terminal assembly.

2. A thermal protector according to claim 1, wherein said one terminal of the thermal switch is provided with a support plate on which the receptacle is supported so as to be located at one of two opposite sides of the terminals, which are juxtaposed, wherein said other terminal of the thermal switch is supported at the other side of the juxtaposed terminals, the receptacle and said other terminal extending in parallel to the casing of the thermal switch in the longitudinal direction thereof each toward the other on different levels, and wherein the common terminal cavity is formed in the side having the face on which the holding portions are formed, the common terminal cavity being partially partitioned by a partition wall into two cavities, one of the cavities receiving the receptacle and the other cavity receiving said other terminal.

3. A thermal protector according to claim 1, wherein the common terminal cavity serves as the central terminal cavity and wherein the holding portions are formed on one side of the body of the cluster socket so as to be parallel to the central terminal cavity.

4. A thermal protector according to claim 1 further comprising an insulating cover formed of an insulating thin film material and having two engagement holes formed in the opposite sides thereof respectively, wherein the holding portions have two hooks formed on outer central portions of the hook-shaped portions thereof respectively, wherein the engagement holes of the insulating cover are previously engaged with the hooks of the holding portions and thereafter, the thermal switch is inserted inside the insulating cover to be held by the holding portions so that tension is applied to the insulating cover.

5. A thermal protector according to claim 2, further comprising an insulating cover formed of an insulating thin film material and having two engagement holes formed in the opposite sides thereof respectively, wherein the holding portions have two hooks formed on outer central portions of the hook-shaped portions thereof respectively, wherein the engagement holes of the insulating cover are previously engaged with the hooks of the holding portions and thereafter, the thermal switch is inserted inside the insulating cover to be held by the holding portions so that tension is applied to the insulating cover.

6. A thermal protector according to claim 3, further comprising an insulating cover formed of an insulating thin film material and having two engagement holes formed in the opposite sides thereof respectively, wherein the holding portions have two hooks formed on outer central portions of the hook-shaped portions thereof respectively, wherein the engagement holes of the insulating cover are previously engaged with the hooks of the holding portions and thereafter, the thermal switch is inserted inside the insulating cover to be held by the holding portions so that tension is applied to the insulating cover.

\* \* \* \* \*